United States Patent
Gross et al.

(10) Patent No.: US 7,543,180 B2
(45) Date of Patent: Jun. 2, 2009

(54) ENHANCING THROUGHPUT AND FAULT-TOLERANCE IN A PARALLEL-PROCESSING SYSTEM

(75) Inventors: Kenny C. Gross, San Diego, CA (US); Alan Paul Wood, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 645 days.

(21) Appl. No.: 11/371,998

(22) Filed: Mar. 8, 2006

(65) Prior Publication Data

US 2007/0214394 A1    Sep. 13, 2007

(51) Int. Cl.
*G06F 11/00* (2006.01)
(52) U.S. Cl. .............................. 714/11; 714/12; 714/13
(58) Field of Classification Search ............... 714/10–13
See application file for complete search history.

(56) References Cited

U.S. PATENT DOCUMENTS

| | | | | |
|---|---|---|---|---|
| 5,835,697 A | * | 11/1998 | Watabe et al. ................. | 714/11 |
| 7,017,073 B2 | * | 3/2006 | Nair et al. ..................... | 714/11 |
| 7,117,389 B2 | * | 10/2006 | Luick ........................... | 714/11 |
| 2004/0221193 A1 | * | 11/2004 | Armstrong et al. ............ | 714/10 |
| 2005/0172164 A1 | * | 8/2005 | Fox et al. ...................... | 714/13 |
| 2006/0107108 A1 | * | 5/2006 | Geng et al. .................... | 714/11 |

* cited by examiner

*Primary Examiner*—Bryce P Bonzo
(74) *Attorney, Agent, or Firm*—Park, Vaughan & Fleming LLP

(57) ABSTRACT

One embodiment of the present invention provides a system that enhances throughput and fault-tolerance in a parallel-processing system. During operation, the system first receives a task. Next, the system partitions N computing nodes into M set-aside nodes and N-M primary computing nodes, wherein $M \geq 1$. The system then processes the task in parallel across the N-M primary computing nodes. While doing so, the system proactively monitors the health of each of the N-M primary computing nodes. If the system detects a node in the N-M primary computing nodes to be at risk of failure, the system copies the portion of the task associated with the at-risk node to a subset of the M set-aside nodes. The system then processes the portion of the task in parallel across the subset of the M set-aside nodes while the N-M primary computing nodes continue executing.

21 Claims, 3 Drawing Sheets

ENHANCING THROUGHPUT AND FAULT-TOLERANCE IN A PARALLEL-PROCESSING SYSTEM

RELATED APPLICATION

The subject matter of this application is related to the subject matter in a co-pending non-provisional application by the same inventors as the instant application entitled, "Method and Apparatus for Providing Fault-Tolerance in Parallel-Processing Systems," having Ser. No. 11/385,429, and filed Mar. 20, 2006.

BACKGROUND

1. Field of the Invention

The present invention relates to techniques for enhancing throughput and fault-tolerance in parallel-processing systems. More specifically, the present invention relates to a method and an apparatus that enhances throughput and fault-tolerance in a parallel-processing system by using standby computing nodes to take over jobs from computing nodes that are determined to be at risk of failure.

2. Related Art

Computation-intensive and memory-intensive applications, such as proteomics and genomics in life sciences, often use message-passing techniques to distribute computational work across multiple computing nodes. This typically involves decomposing a problem into multiple smaller problems, which are then executed in parallel across a plurality of computing nodes on a parallel-processing system.

For example, a problem can be decomposed into N "chunks," and the chunks can be distributed across N computing nodes to be processed in parallel, thereby decreasing the execution time of the parallel-computing application by a factor of approximately N (less the overhead due to inter-process communications and the overhead for combining the processed chunks). Particularly, one class of problems which is referred to as "embarrassingly parallel" problems in high-performance computing (HPC) incurs minimal overhead from inter-process communications and combining the processed chunks, because the associated parallel processes are either independent or very loosely coupled. Hence, using N identical computing nodes, this class of problems can achieve speedup factors very close to N.

Unfortunately, one drawback of existing message-passing techniques for parallel-computing applications is that they lack a fault-tolerance mechanism. Consequently, if one of the computing nodes fails before all of the chunks complete, the entire parallel-processing job needs to be restarted from the beginning.

One solution to this fault-tolerance problem is to use a checkpointing technique, wherein the system periodically stores the states of all computing nodes into memory and/or disk. By periodically performing checkpoints, if a machine or a single computing node crashes during execution, the system does not have to start the entire problem over. Instead, the system can simply return to the last checkpoint to retrieve the saved state information and can restart from there.

Unfortunately, the checkpointing process can increase the execution time of the parallel-computing application. Specifically, if a checkpoint is taken too frequently, the checkpointing overhead can become significant enough to largely mitigate the speedup gains that result from parallel execution. On the other hand, if a checkpoint is taken too infrequently, there is an increased likelihood of losing data that has been computed since the last checkpoint was taken.

Hence, what is needed is a method and an apparatus for enhancing the throughput and fault-tolerance in a parallel-processing environment without the above-described problems.

SUMMARY

One embodiment of the present invention provides a system that enhances throughput and fault-tolerance in a parallel-processing system. During operation, the system first receives a task. Next, the system partitions N computing nodes into M set-aside nodes and N-M primary computing nodes, wherein $M \geq 1$. The system then processes the task in parallel across the N-M primary computing nodes. While doing so, the system proactively monitors the health of each of the N-M primary computing nodes. If the system detects a node in the N-M primary computing nodes to be at risk of failure, the system copies the portion of the task associated with the at-risk node to a subset of the M set-aside nodes. The system then processes the portion of the task in parallel across the subset of the M set-aside nodes while the N-M primary computing nodes continue executing.

In a variation on this embodiment, the system processes the task in parallel across the N-M primary computing nodes by first dividing the task into N-M subtasks, and subsequently executing each of the N-M subtasks on one of the N-M primary computing nodes.

In a variation on this embodiment, prior to copying the portion of the task associated with the at-risk node to the subset of the M set-aside nodes, the system additionally proactively monitors the health of each of the M set-aside nodes while the task is being processed by the N-M primary computing nodes. If a node in the M set-aside nodes is detected to be at risk of failure, the system either removes the node from the set-aside nodes or replaces the node with a healthy node.

In a further variation on this embodiment, the system monitors the set-aside nodes by running monitoring programs on the set-aside nodes.

In a variation on this embodiment, the system allows the at-risk node to continue processing the associated portion of the task after the system has copied the portion of the task to the subset of the M set-aside nodes.

In a further variation on this embodiment, the system determines if the at-risk node fails before completing the associated portion of the task. If so, the system obtains results for the associated portion of the task by combining the execution results for the portion of the task from the subset of the M set-aside nodes.

In a further variation on this embodiment, if the at-risk node does not fail before completing the associated portion of the task, the system replaces or repairs the at-risk node prior to processing the next task.

In a variation on this embodiment, the system proactively monitors the health of the N-M primary computing nodes by monitoring telemetry signals from each of the N-M primary computing nodes.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, random access memory (RAM), magnetic and optical storage devices such as disk drives, magnetic tape, CDs (compact discs) and DVDs (digital versatile discs or digital video discs).

Parallel-Processing System

Figure 1:
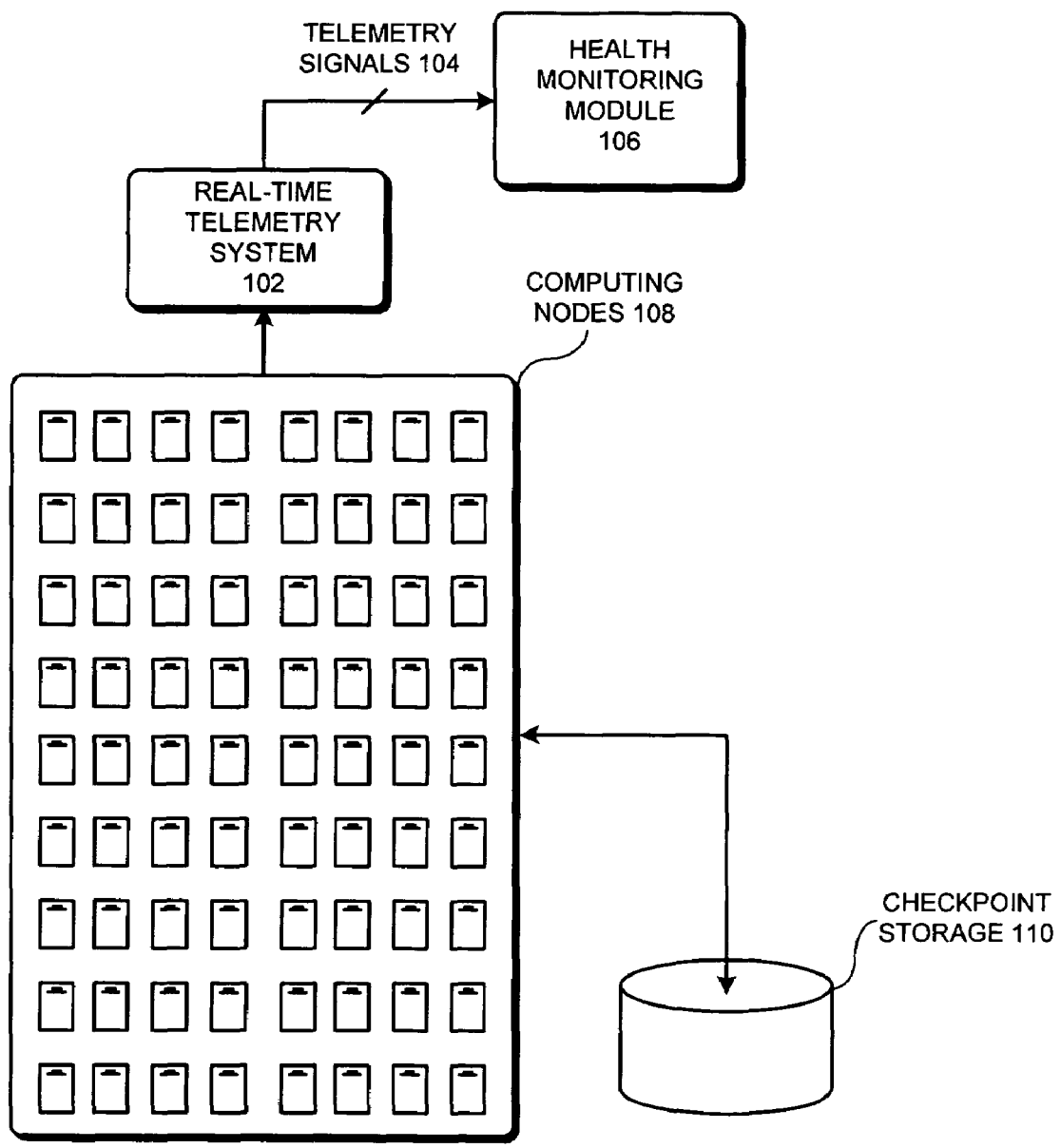
FIG. 1 illustrates a parallel-processing system being monitored by a real-time telemetry system in accordance with an embodiment of the present invention.

FIG. 1 illustrates a parallel-processing system 100 being monitored by a real-time telemetry system 102 in accordance with an embodiment of the present invention. Parallel-processing system 100 includes real-time telemetry system 102, telemetry signals 104, health monitoring module 106, and computing nodes 108.

Real-time telemetry system 102 gathers information from the various sensors and monitoring tools within each of computing nodes 108, and directs the signals to a local or to a remote location that contains health monitoring module 106. Note that the telemetry signals gathered by real-time telemetry system 102 can include hardware variables and/or software variables. The software variables can include, but is not limited to: load metrics, CPU utilization, idle time, memory utilization, disk activity, transaction latencies, and other performance metrics reported by the operating system. The hardware variables can include, but is not limited to: temperature, voltage and current.

Health monitoring module 106 analyzes the output signals while the telemetry signals are being collected from all of the computing nodes 108, and predicts the risk of failure for each computing nodes 108. In one embodiment of the present invention, health monitoring module 106 is a Continuous System Telemetry Harness (CSTH).

Note that each computing node within computing nodes 108 can include any type of computing device, including, but not limited to, a microprocessor, a mainframe computer, a digital signal processor, a personal organizer, a device controller and a computational engine within an appliance. Also note that although parallel-processing system 100 illustrated in FIG. 1 contains 72 computing nodes, the actual number of computing nodes 108 can vary depending on the computing requirements.

When parallel-processing system 100 takes a checkpoint during a parallel-computing application, it saves the state of the parallel-computing application from each computing node to checkpoint storage device 110.

Note that checkpoint storage device 110 can include any type of non-volatile storage device that can be coupled to a computer system. This includes, but is not limited to, random access memory (RAM), magnetic, optical, and magneto-optical storage devices, as well as storage devices based on flash memory and/or battery-backed up memory.

Set-Aside Nodes

Assume that there are a total of N computing nodes within parallel-processing system 100. During a parallel-processing task, instead of distributing the task across all of the N computing nodes, the system sets aside a small group of M nodes, which are referred to as "set-aside nodes". The system then distributes the computing task across the remaining (N-M) nodes, which are referred to as "primary computing nodes."

Figure 2:
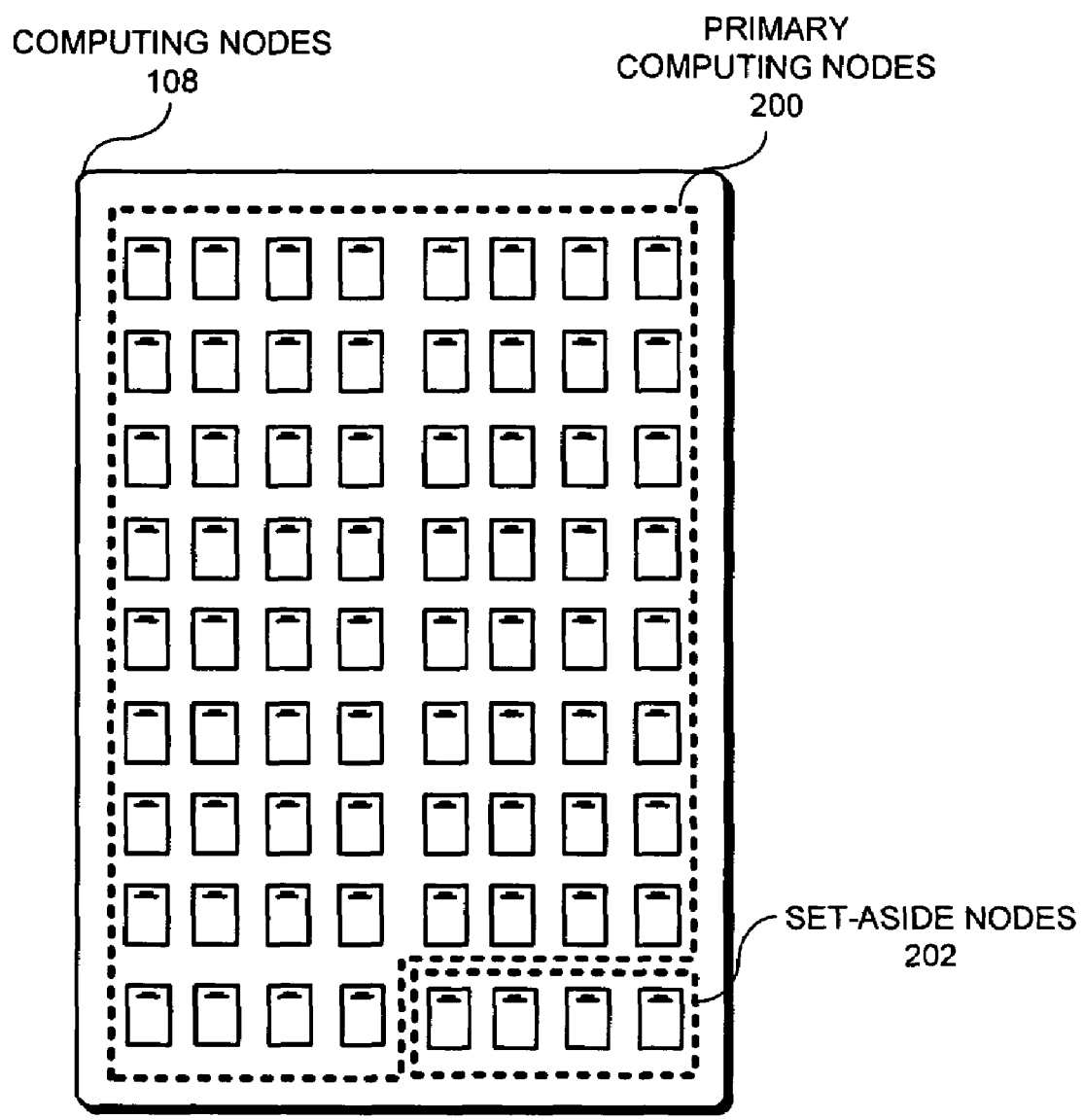
FIG. 2 illustrates the process of partitioning computing nodes within a parallel-processing system into primary computing nodes and set-aside nodes in accordance with an embodiment of the present invention.

FIG. 2 illustrates the process of partitioning computing nodes within parallel-processing system 100 into primary computing nodes and set-aside nodes in accordance with an embodiment of the present invention. Note that of the 72 total nodes, 4 nodes are designated as set-aside nodes while the remaining 68 nodes are designated as the primary computing nodes.

Parallel-Processing With Set-Aside Nodes

Figure 3:
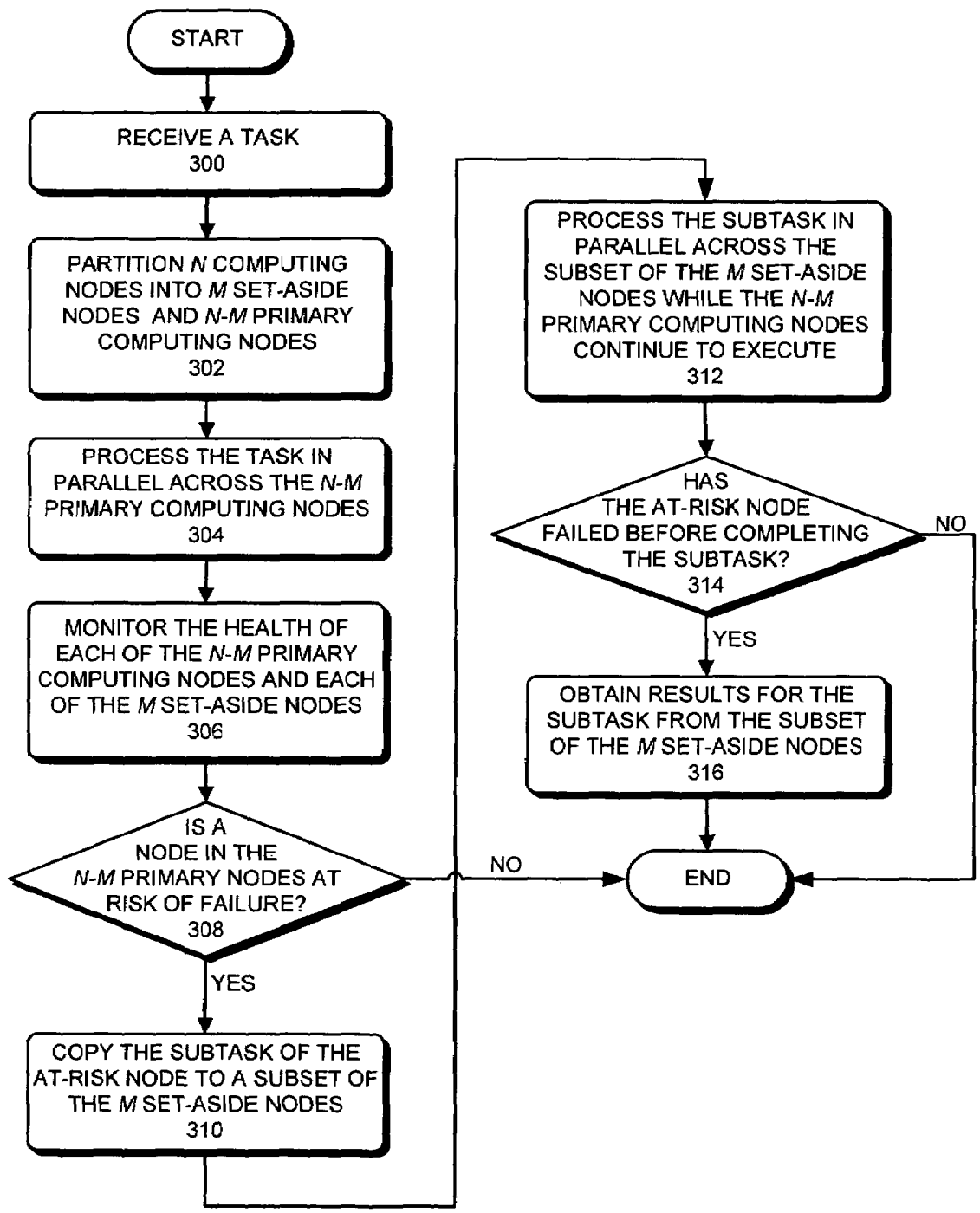
FIG. 3 presents a flowchart illustrating the process of enhancing throughput and fault-tolerance in a parallel-processing system by using set-aside nodes in accordance with an embodiment of the present invention.

FIG. 3 presents a flowchart illustrating the process of enhancing throughput and fault-tolerance in a parallel-processing system by using set-aside nodes in accordance with an embodiment of the present invention.

During operation, the system first receives a task (step 300). Next, the system partitions N computing nodes within the parallel-processing system into M set-aside nodes and N-M primary computing nodes, wherein $M \geq 1$ (step 302). Typically, only a small number of computing nodes are designated as the set-aside nodes, while the majority of computing nodes are designated as the primary computing nodes.

Next, the system processes the task in parallel across the N-M primary computing nodes (step 304). More specifically, the system first divides the task into N-M subtasks, and subsequently executes each of the N-M subtasks on one of the N-M primary computing nodes.

While the task is being processed across the N-M primary computing nodes, the system continuously and proactively monitors the health of each of the N-M primary computing nodes (step 306). In one embodiment of the present invention, the system uses both real-time telemetry system 102 and health monitoring module 106 to monitor and evaluate the health of each of the N-M primary computing nodes.

Note that the system also proactively monitors the health of each of the M set-aside nodes while the task is being processed by the N-M primary computing nodes (step 306). If the system detects a node in the M set-aside nodes to be at risk of failure, the system can either remove that node from the set-aside nodes or replace that node with a healthy node. In doing so, the system is confident that the set-aside nodes are healthy at the time they are needed. Because the set-aside nodes cannot sit idle while being monitored, the system typically runs exerciser codes on the set-aside nodes, such as monitoring programs.

Next, the system determines if any node in the N-M primary computing nodes is at risk of failure (step 308). If no node is found to be at risk during the task execution process, no action is taken.

Otherwise, if a node is found to be at risk in step 308, the system copies the portion of the task associated with the at-risk node to a subset of the M set-aside nodes (step 310). In one embodiment of the present invention, the system copies the original unprocessed subtask partitioned to the at-risk node to the set-aside nodes. In another embodiment of the present invention, the system copies the partially executed subtask from the at-risk node to the set-aside nodes.

The system processes that portion of the task in parallel across the subset of the M set-aside nodes while the N-M primary computing nodes continue to execute (step 312). In one embodiment of the present invention, the system copies the portion of the task to a single set-aside node. In another embodiment of the present invention, the system copies the portion of the task across the entire M set-aside nodes. Alternatively, the system can copy the portion of the task to an arbitrary subset of the M set-aside nodes. Note that there can be a performance tradeoff depending on the size of the subset selected. In one embodiment of the present invention, the system determines the size of the subset based on the time when the at-risk node is found. For example, if the at-risk node is found near the end of the task execution, the entire M set-aside nodes will be selected and used.

Note that the system does not wait until a primary node actually fails. Instead, the proactive fault-monitoring mechanism used by the health monitoring module 106 (e.g., a CSTH) generates a warning flag when it detects leading indicators of failures before the failures actually occur. Also note that after copying the portion of the task to the subset of the M set-aside nodes (step 310), the at-risk node is allowed to continue processing the associated portion of the task until the task execution is complete on both the primary nodes and the set-aside nodes.

Next, the system determines if the at-risk node has failed before completing the associated portion of the task (step 314). If so, the system obtains results for the associated portion of the task from the subset of the M set-aside nodes by combining the execution results for the portion of the task from these set-aside nodes (step 320). Otherwise, the system can obtain the results for the associated portion of the task from either the at-risk node or the set-aside nodes. Furthermore, the system replaces or repairs the at-risk node prior to processing the next task.

In a variation to the above-described process, the system can terminate the execution on the at-risk node after the associated subtask has been transferred to the set-aside nodes. In this case, the system obtains the results for the associated subtask exclusively from those set-aside nodes.

Note that the above-described technique can enhance the throughput and fault-tolerance in a number of ways: (1) If the node that is flagged as being at-risk fails before the subtask on that node completes, the subtask is already running in parallel with a nominal speedup factor equal to the size of the selected subset of the M set-aside nodes. (2) If the node that is flagged as being at-risk does not fail and completes the associated subtask, the system still achieves a speedup factor of close to N-M for the entire task. In both cases, the system avoids the worst-case scenario of restarting the entire task if one of the nodes fails before all N nodes complete their associated subtasks.

Also note that, while the description above deals with only one at-risk node, it should be apparent to one of ordinary skill in the art to extend the general technique to handle multiple primary computing nodes that are found to be at risk.

Combining Set-Aside Nodes With Checkpointing

The above-described technique increases the throughput and fault-tolerance of a parallel-computing application without checkpointing. Alternatively, one may choose to use the set-aside nodes technique in tandem with checkpointing. In this case, one can reduce the frequency of checkpointing to provide a desired level of fault-tolerance, thereby alleviating the overhead penalty associated with the checkpointing. Note that when combining the checkpointing technique with the set-aside node technique, the system increases the level of fault-tolerance for any given frequency of checkpointing.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enhancing throughput and fault-tolerance in a parallel-processing system, wherein the parallel-processing system comprises N computing nodes, the method comprising:

receiving a task;

partitioning the N computing nodes into M set-aside nodes and N-M primary computing nodes, wherein $M \geq 1$; and processing the task in parallel across the N-M primary computing nodes by, proactively monitoring the health of each of the N-M primary computing nodes; and if a node in the N-M primary computing nodes is detected to be at risk of failure, copying the portion of the task associated with the at-risk node to a subset of the M set-aside nodes; and processing the portion of the task in parallel across the subset of the M set-aside nodes while the N-M primary computing nodes continue executing.

2. The method of claim 1, wherein processing the task in parallel across the N-M primary computing nodes involves:

dividing the task into N-M subtasks; and executing each of the N-M subtasks on one of the N-M primary computing nodes.

3. The method of claim 1, wherein prior to copying the portion of the task associated with the at-risk node to the subset of the M set-aside nodes, the method further comprises:

proactively monitoring the health of each of the M set-aside nodes while the task is being processed by the N-M primary computing nodes; and if a node in the M set-aside nodes is detected to be at risk of failure, removing the node from the set-aside nodes; or replacing the node with a healthy node.

4. The method of claim 3, wherein monitoring the set-aside nodes involves running monitoring programs on the set-aside nodes.

5. The method of claim 1, wherein the at-risk node is allowed to continue processing the associated portion of the task, after the portion of the task is copied to the subset of the M set-aside nodes.

6. The method of claim 5, wherein if the at-risk node fails before completing the associated portion of the task, the method further comprises obtaining results for the associated portion of the task by combining the execution results for the portion of the task from the subset of the M set-aside nodes.

7. The method of claim 5, wherein if the at-risk node does not fail before completing the associated portion of the task, the method further comprises replacing or repairing the at-risk node prior to processing the next task.

8. The method of claim 1, wherein monitoring proactively the health of the N-M primary computing nodes involves monitoring telemetry signals from each of the N-M primary computing nodes.

9. A computer-readable storage medium storing instructions that when executed by a computer cause the computer to perform a method for enhancing throughput and fault-tolerance in a parallel-processing system, wherein the parallel-processing system comprises N computing nodes, the method comprising:
- receiving a task;
- partitioning the N computing nodes into M set-aside nodes and N-M primary computing nodes, wherein M≧1; and
- processing the task in parallel across the N-M primary computing nodes by,
  - proactively monitoring the health of each of the N-M primary computing nodes; and
  - if a node in the N-M primary computing nodes is detected to be at risk of failure,
    - copying the portion of the task associated with the at-risk node to a subset of the M set-aside nodes; and
    - processing the portion of the task in parallel across the subset of the M set-aside nodes while the N-M primary computing nodes continue executing.

10. The computer-readable storage medium of claim 9, wherein processing the task in parallel across the N-M primary computing nodes involves:
- dividing the task into N-M subtasks; and
- executing each of the N-M subtasks on one of the N-M primary computing nodes.

11. The computer-readable storage medium of claim 9, wherein prior to copying the portion of the task associated with the at-risk node to the subset of the M set-aside nodes, the method further comprises:
- proactively monitoring the health of each of the M set-aside nodes while the task is being processed by the N-M primary computing nodes; and
- if a node in the M set-aside nodes is detected to be at risk of failure,
  - removing the node from the set-aside nodes; or
  - replacing the node with a healthy node.

12. The computer-readable storage medium of claim 11, wherein monitoring the set-aside nodes involves running monitoring programs on the set-aside nodes.

13. The computer-readable storage medium of claim 9, wherein the at-risk node is allowed to continue processing the associated portion of the task, after the portion of the task is copied to the subset of the M set-aside nodes.

14. The computer-readable storage medium of claim 13, wherein if the at-risk node fails before completing the associated portion of the task, the method further comprises obtaining results for the associated portion of the task by combining the execution results for the portion of the task from the subset of the M set-aside nodes.

15. The computer-readable storage medium of claim 13, wherein if the at-risk node does not fail before completing the associated portion of the task, the method further comprises replacing or repairing the at-risk node prior to processing the next task.

16. The computer-readable storage medium of claim 9, wherein monitoring proactively the health of the N-M primary computing nodes involves monitoring telemetry signals from each of the N-M primary computing nodes.

17. An apparatus that enhances throughput and fault-tolerance in a parallel-processing system, wherein the parallel-processing system comprises N computing nodes, comprising:
- a receiving mechanism configured to receive a task;
- a partitioning mechanism configured to partition the N computing nodes into M set-aside nodes and N-M primary computing nodes, wherein M≧1;
- a monitoring mechanism configured to proactively monitor the health of each of the N-M primary computing nodes while the task is being processed in parallel across the N-M primary computing nodes; and
- wherein if the monitoring mechanism detects a node in the N-M primary computing to be at risk of failure, the monitoring mechanism is configured to
  - copy the portion of the task associated with the at-risk node to a subset of the M set-aside nodes; and to
  - process the portion of the task in parallel across the subset of the M set-aside nodes while the N-M primary computing nodes continue executing.

18. The apparatus of claim 17, further comprising:
- a dividing mechanism configured to divide the task into N-M subtasks; and
- an execution mechanism configured to execute each of the N-M subtasks on one of the N-M primary computing nodes.

19. The apparatus of claim 17, further comprising:
- a monitoring mechanism configured to proactively monitor the health of each of the M set-aside nodes while the task is being processed by the N-M primary computing nodes;
- wherein if the monitoring mechanism detects a node in the M set-aside nodes to be at risk of failure, the monitoring mechanism is configured to
  - remove the node from the set-aside nodes; or to
  - replace the node with a healthy node.

20. The apparatus of claim 19, wherein the monitoring mechanism is configured to run monitoring programs on the set-aside nodes.

21. The apparatus of claim 17, wherein the at-risk node is allowed to continue processing the associated portion of the task after copying the portion of the task to the subset of the M set-aside nodes.

* * * * *